Aug. 1, 1933.    L. L. TIRRELL    1,920,721
SPRAYING DEVICE
Filed March 24, 1930    2 Sheets-Sheet 1
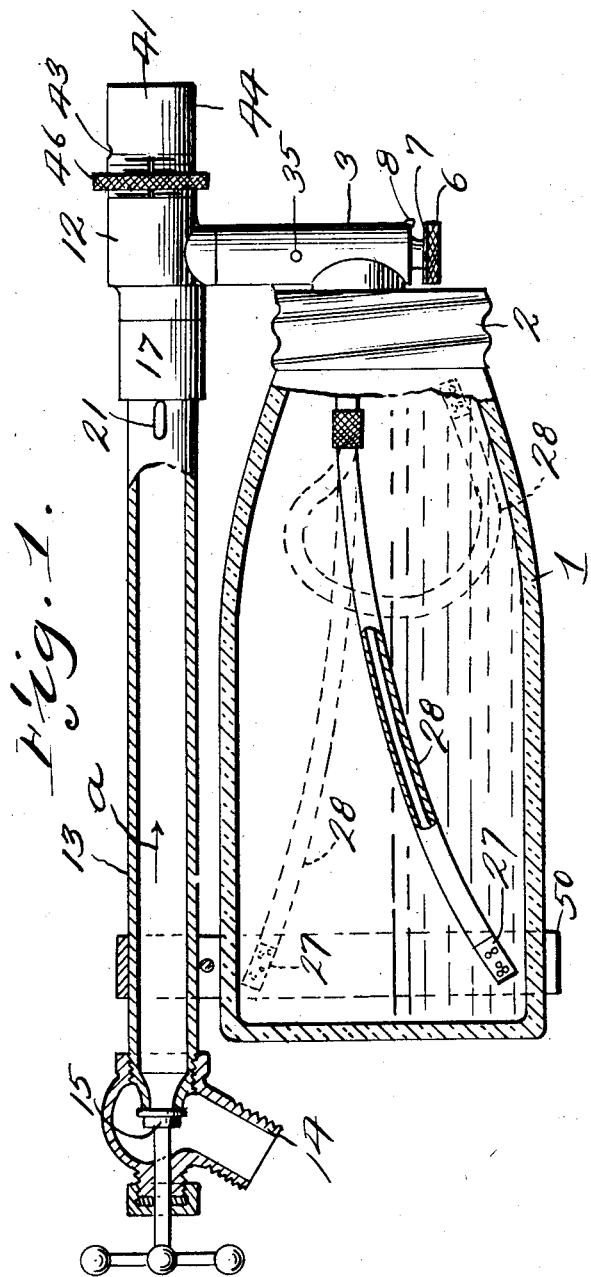
INVENTOR.
L. L. Tirrell
BY
ATTORNEY.

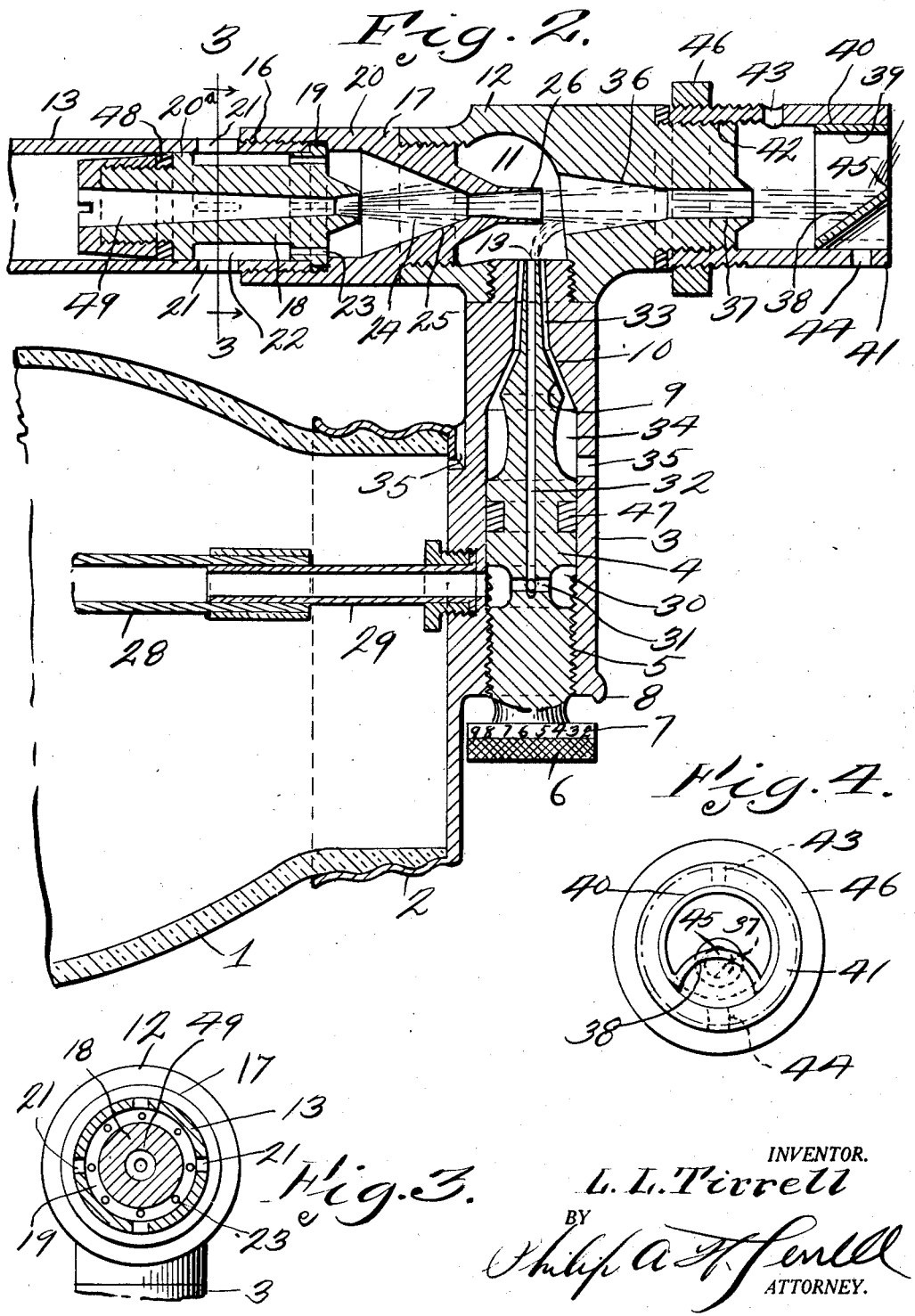

Patented Aug. 1, 1933

1,920,721

UNITED STATES PATENT OFFICE 1,920,721

SPRAYING DEVICE

Leslie L. Tirrell, Washington, D. C.

Application March 24, 1930. Serial No. 438,519

5 Claims. (Cl. 299—84)

The invention relates to spraying devices and has for its object to provide a device of this character wherein a regulated supply of insecticide or other liquid may be supplied to a liquid, for instance water, passing through the device under pressure.

A further object is to provide a spraying device comprising an elongated body member having nozzles extending into adjacent chambers thereby forming air and liquid ejectors between a discharge nozzle and a source of liquid supply.

A further object is to provide a receptacle for insecticide or other liquid in connection with the liquid supply valve and means cooperating with the liquid supply valve at its discharge end, whereby the liquid will pass to a stream of water in the liquid ejector.

A further object is to provide the receptacle with a removable cover, which cover supports the spraying device.

A further object is to provide the chambers of the main liquid supply passage with tapered discharge ends against the walls of which, the liquid is projected from the nozzles and constricted for setting up a vacuum or suction from the discharge nozzles and to provide means whereby air may be admitted to one of said chambers thereby forming an air ejector for preventing a back suction incident to vacuum and a liquid ejector.

A further object is to provide means whereby air may be admitted around the fluid regulating tube at its point of discharge for regulating the amount of liquid drawn through the tube from the receptacle.

A further object is to provide the regulating air valve with a liquid passage therethrough, and a chamber around said air valve in communication with the atmosphere and discharging to the main fluid passage around the air valve, and a seat carried by the air valve casing, and with which the air valve cooperates for regulating the amount of air allowed to pass to the main fluid passage.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a side elevation of the device, parts being shown in vertical longitudinal section to better show the structure.

Figure 2 is a vertical longitudinal sectional view through the forward end of the spraying device.

Figure 3 is a vertical transverse sectional view taken on line 3—3 of Figure 2.

Figure 4 is a view in elevation of the discharge end of the sprayer.

Figure 5 is a vertical longitudinal sectional view through the strainer.

Referring to the drawings, the numeral 1 designates a receptacle which may be of any size desired, and which receptacle is preferably formed from a transparent material, for instance glass, so that the liquid content thereof may be easily ascertained. Detachably connected to one end of the transparent receptacle 1 is a metallic cap 2, and formed preferably integral therewith is a vertically disposed air valve casing 3, in which is axially movable a tapered conduit tube 4. The lower end of the tube 4 is threaded at 5 into the casing 3 and is provided with a knurled finger engaging member 6 having indicia 7 thereon, adapted to be placed in registration with a pointer 8 carried by the tube casing 3, so that the operator can regulate the main valve portion 9 of the tube 4 in relation to the valve seat 10 for varying the amount of air allowed to pass to the chamber 11 of the sprayer head 12 around the discharge end 13 of the tube 4, as clearly shown in Figure 2.

In operation, water under pressure passes through the pipe 13 in the direction of the arrow a, Figure 1, and before discharge of said water an insecticide or other chemical is added to the water in controllable quantities. The rear end of the pipe 13 is provided with an angularly disposed threaded portion 14, to which a hose may be attached, and the amount of water allowed to pass through the pipe 13 may be regulated by manipulating the valve 15. The forward end of the pipe 13 is threaded at 16 into an intermediate member 17, and through which intermediate member the water under pressure passes.

Disposed within the forward end of the pipe 13 is a nozzle 18, the forward end of which is provided with an annular flange 19 interposed between the forward end of the pipe 13 and the shoulder 20 of the intermediate section 17, thereby preventing axial displacement of the nozzle. Nozzle 18 extends rearwardly into the pipe 13, and is provided with an annular flange 20 located rearwardly of air intake ports 21, through which air passes to the annular chamber 22 around the nozzle and thence through the air ports 23 in the flange 19, thereby preventing the formation of a vacuum rearwardly of the fluid 24, which is projected against the forwardly tapered restricting walls 25 of the intermediate section 17. The water then entrains some of said air and passes through the flared discharge end of the discharge nozzle 26 into the chamber 11 where the vacuum is reduced to a minimum incident to the entrance of the entrained air from the first chamber where it sets up an action which will entrain insecticide or other fluid from the discharge end 13 of the tube 4, causing a flow of liquid from the receptacle 1 through the weighted strainer 27, flexible pipe 28, nipple 29, carried by the cap 2, the annular chamber 30 extending around the needle valve and ports 31 connecting the chamber 30, and the port 32 extending through the needle valve into communication with the chamber 11. Nozzle 18 in combination with the air inlet at 21 and restricted walls 25 forms an air ejector, while nozzle 26, chamber 11 and walls 36 form a liquid ejector, and both of said ejectors are interposed between a source of liquid supply and discharge, and into the liquid ejector insecticide is entrained.

The amount of insecticide or other liquid allowed to pass through the port 32 is regulated by the amount of air allowed to be sucked through the air passage 33 around the needle valve from the chamber 34, which has communication with the atmosphere through the ports 35, said regulation is obtained by adjustment of the needle valve, which when moved towards closed position would increase the amount of liquid entrained, and when moved away from closed position would increase the amount of air entrained, thereby reducing the amount of liquid.

The liquid with the insecticide mixed therein engages the forwardly tapered passage walls 36, which sets up a suction within the chamber 11 for the entraining operation at the nozzle end 13 and then passes through the restricted portion 37 of the head 12, which it will be noted is off center in relation to said head, and then engages the inclined semiconically-shaped deflecting and spraying member 38, which is formed by bending inwardly one side of the sleeve 39 as clearly shown in Figure 2. Sleeve 39 may be braced or otherwise secured at 40 within the rotatable sleeve 41, threaded at 42 on the head 12, and it will be noted that by rotating the sleeve 41, the deflecting member 38 may be placed in various positions in relation to the discharge port 37 for spraying in different directions or moved to a position where the discharge fluid will not engage said deflector, which is particularly desirable for spraying at a distance from the device.

An air passage 43 is provided in the sleeve 41, through which air will pass for preventing the formation of a vacuum to the rear of the spraying device 38, and the sleeve 41 beneath the deflecting member 38 is provided with an air passage 44 through which air may pass for preventing a vacuum adjacent the discharge member and to prevent dripping at the discharge edge 45 of the deflecting plate 38, which dripping is commonly known in the trade as "slabbering". Sleeve 41 is preferably provided with a split end having a lock nut 46 thereon for locking the sleeve in any particular position, however this may be dispensed with if desired. Tube 4 is provided with a packing 47 for preventing leakage, and the nozzle member 18 is provided with a packing 48 rearwardly of the air passage 21 for preventing leakage around the nozzle and insuring passage of all of the fluid through the forwardly tapered port 49 of the nozzle 18.

Pipe 28 is preferably formed from rubber and the strainer 27 is of sufficient weight whereby upon inclination with the receptacle 1, the flexible tube 28 will be bent so that the member 27 will assume low position by gravity, as clearly shown in dotted lines in Figure 1. The rear end of the pipe 13 is provided with a downwardly extending bracket 50, which supports the rear end of the receptacle 1.

From the above it will be seen that a spraying nozzle is provided which is particularly adapted for mixing a liquid insecticide with a stream of liquid under pressure; that a double nozzle effect is provided, and air is mixed with the fluid under pressure or back of said fluid for preventing the formation of a vacuum around the first nozzle and reducing the vacuum in the chambers into which they discharge, and that the second nozzle entrains the insecticide from a receptacle and the amount of insecticide entrained is regulated according to the amount of air allowed to pass the needle valve.

The invention having been set forth what is claimed as new and useful is:—

1. A spraying device comprising a body having a liquid passage therethrough, means at one end of said passage for attaching it to a source of liquid under pressure, a discharge nozzle at the other end of said passage, ejector means in said body whereby liquid flowing in said passage towards said discharge nozzle will draw air from the surrounding atmosphere into the passage, a second ejector in said passage between said ejector means and said discharge nozzle having a suction chamber therein, a liquid receptacle, an outlet conduit for said receptacle connected to said suction chamber for feeding liquid from said receptacle into said passage.

2. A device as set forth in claim 1 including means whereby air is admitted to the suction chamber through an air inlet.

3. A device as set forth in claim 1 including an air inlet to the suction chamber and a regulating valve controlling said air inlet.

4. A device as set forth in claim 1 including an air inlet to the suction chamber, a regulating valve controlling said air inlet, said air inlet discharging into the suction chamber through a substantially circular port around said outlet conduit.

5. A device as set forth in claim 1 wherein air ports are provided rearwardly of the first mentioned ejector means and through which the air is drawn from the surrounding atmosphere into the passage.

LESLIE L. TIRRELL.